(12) United States Patent
Aliferis et al.

(10) Patent No.: US 7,117,185 B1
(45) Date of Patent: Oct. 3, 2006

(54) METHOD, SYSTEM, AND APPARATUS FOR CASUAL DISCOVERY AND VARIABLE SELECTION FOR CLASSIFICATION

(75) Inventors: Constantin F. Aliferis, Nashville, TN (US); Ioannis Tsamardinos, Nashville, TN (US)

(73) Assignee: Vanderbilt University, Nashville, TN (US)

(*) Notice: Subject to any disclaimer, the term of this patent is extended or adjusted under 35 U.S.C. 154(b) by 522 days.

(21) Appl. No.: 10/439,374

(22) Filed: May 14, 2003

Related U.S. Application Data

(60) Provisional application No. 60/380,647, filed on May 15, 2002, provisional application No. 60/420,877, filed on Oct. 24, 2002.

(51) Int. Cl.
*G06F 15/18* (2006.01)
(52) U.S. Cl. .............................. 706/12; 706/14; 706/46
(58) Field of Classification Search .................. 706/12, 706/14, 46
See application file for complete search history.

(56) References Cited

U.S. PATENT DOCUMENTS

| | | | | |
|---|---|---|---|---|
| 5,704,017 A | * | 12/1997 | Heckerman et al. ........... | 706/12 |
| 5,805,776 A | | 9/1998 | Juengst et al. | |
| 6,076,083 A | * | 6/2000 | Baker ........................... | 706/52 |
| 6,246,975 B1 | | 6/2001 | Rivonelli et al. | |
| 6,336,108 B1 | | 1/2002 | Thiesson et al. | |
| 6,456,622 B1 | * | 9/2002 | Skaanning et al. ......... | 370/389 |
| 6,480,832 B1 | | 11/2002 | Nakisa | |

OTHER PUBLICATIONS

Clark Glymour, Computation, Causation, and Discovery, Jun. 1999, The MIT Press, Chapter ONE.*

C. F. Aliferis et al, HITON, A Novel Markov Blanket Algorithm for Optimal Variable Selection, 2003, AMIA, (five).*

Ioannis Tsamardinos et al, Time and Sample Efficient Discovery of Markov Blankets and Direct Causal Relations, ACM, (ten).*

Burges, C.J.C., "A tutorial on Support Vector Machines for Pattern Recognition", Data Mining and Knowledge Discovery, vol. 2, No. 2, pp. 1-47, 1998.

Caruana, R., et al., "Greedy Attribute Selection", Int'l. Conf. on Machine Learning, 1994.

Cheng, J., et al., "Comparing Bayesian Network Classifiers", 15th Conf. on Uncertainty in Artificial Intelligence, UAI, 1999.

Cheng, J., et al., "KDD Cup 2001 Report", SIGKDD Explorations, vol. 3, Issue 2, pp. 47-64, 2002.

Cooper, G.F., et al., "A Bayesian Method for the Induction of Probabilistic Networks from Data", Machine Learning 9, pp. 309-347, 1992.

Guyon, I., et al., "Gene Selection for Cancer Classification Using Support Vector Machines", Machine Learning, vol. 46, pp. 389-422, (2002).

Heckerman, D., "A Bayesian Approach to Learning Causal Networks", Microsoft Research Tech. Rpt. MSR-TR-95-04, Mar. 1995.

(Continued)

*Primary Examiner*—Joseph P. Hirl
(74) *Attorney, Agent, or Firm*—Akerman Senterfitt

(57) ABSTRACT

A method of determining a local causal neighborhood of a target variable from a data set can include identifying variables of the data set as candidates of the local causal neighborhood using statistical characteristics, and including the identified variables within a candidate set. False positive variables can be removed from the candidate set according to further statistical characteristics applied to each variable of the candidate set. The remaining variables of the candidate set can be identified as the local causal neighborhood of the target variable.

53 Claims, 5 Drawing Sheets

OTHER PUBLICATIONS

Kohavi, R., et al., "Wrappers for Feature Subset Selection", Artificial Intelligence, vol. 97, No. 1-2, pp. 273-324, May 20, 1997.

Koller, D., et al., "Toward Optimal Feature Selection", 13th Int'l. Conf. in Machine Learning, 1996.

Platt, J.C., "Sequential Minimal Optimization: A Fast Algorithm for Training Support Vector Machines", Microsoft Research Tech. Rpt. MSR-TR-98-14, Apr. 21, 1998.

Provost, F., et al., "The Case Against Accuracy Estimation for Comparing Induction Algorithms", 15th Int'l. Conf. on Machine Learning, 1998.

Tsarmardinos, I., et al., "Algorithms for Local Causal Discovery", Vanderbilt University Tech. Rpt. DSL-02-03, Jul. 1, 2002.

Weston, J., et al., "Feature Selection and Transduction for Prediction of Molecular Bioactivity for Drug Design", Bioinformatics, vol. 1, No. 2002, pp. 1-8, 2002.

Chang, C.C., et al., "LIBSVM: A Library for Support Vector Machines (Version 2.31)", Dept. of Comp. Science and Info. Engineering, Nat'l. Taiwan Univ., Sep. 7, 2001.

Cheng, J., et al., "Learning Bayesian Networks from Data: An Efficient Approach Based on Information Theory", University of Alberta Tech. Rpt., 1998.

Chickering, D.M., et al., "Learning Bayesian Networks is NP-Hard", Microsoft Research Tech. Rpt., MSR-TR-94-17, 1994.

Mani, S., et al., "A Simulation Study of Three Related Causal Data Mining Algorithms", Artificial Intelligence and Statistics, pp. 73-80, 2001.

Arnone, M. I., et al., "The Hardwiring of Development: Organization and Function of Genomic Regulatory Systems", Development, Vo. 12, No. 4, pp. 1851-1864, 1997.

Blum, A.L., et al., "Selection of Relevant Features and Examples in Machine Learning", Artificial Intelligence, vol. 92, No. 1-2, pp. 245-271, 1997.

Cheng, J., et al., "Learning Bayesian Networks from Data: An Information -Theory Based Approach", Proc. of 6th ACM Int'l. Conf. on Information and Knowledge Mgmt., 1997.

Provan, G.M., et al., "Learning Bayesian Networks Using Feature Selection", 5th Int'l. Workshop on Artificial Intelligence and Statistics, 1995.

Scott, M.J.J., et al., "Parcel: Feature Subset Selection in Variable Cost Domains", Cambridge University, May 1998.

Aliferis, C.F., et al., "Markov Blanket Induction for Feature Selection", Vanderbilt University, Discovery Systems Laboratory Tech. Rpt. DLS-02-02, 2002.

Weston, J., et al., "Feature Selection for SVMs", NIPS, pp. 668-674, 2000.

Wolpert, D.H., et al., "No Free Lunch Theorems for Optimization", IEEE Transactions on Evolutionary Computation, vol. 1, No. 1, pp. 67-82, Apr. 1997.

Friedman, N., et al., "Data Analysis With Bayesian Networks: A Bootstrap Approach", 15th Conf. on Uncertainty in Artificial Intelligence, UAI-99, 1999.

Friedman, N., et al., "Learning Bayesian Network Structure from Massive Datasets: The 'Sparse Candidate' Algorithm", 15th Conf. on Uncertainty in Art. Intelligence, 1999.

Heckerman, D., et al., "A Tutorial on Learning With Bayesian Networks", Microsoft Research Tech. Rpt. MSR-TR-95-06, 1995.

Almuallim, H., et al., "Efficient Algorithms for Identifying Relevant Features", 9th Canadian Conf. on Artificial Intelligence, 1992.

Kononenko, I., "Estimating Attributes: Analysis and Extensions of RELIEF", European Conf. on Machine Learning, 1994.

Aliferis, C.F., et al., "Large-Scale Feature Selection Using Markov Blanket Induction for the Prediction of Protein-Drug Binding", Vanderbilt U. Tech. Rpt. DSL TR-02-06, 2002.

Tsamardinos, I., et al., "Algorithms for Large Scale Local Causal Discovery", Vanderbilt University.

Aliferis, C.F., et al., "Methods for Principled Feature Selection for Classification, Causal Discovery, and Causal Manipulation", Vanderbilt U. Tech. Rpt. DSL-02-01, Mar. 2002.

Tsamardinos, I., et al., "Towards Principled Feature Selection: Relevancy, Filters and Wrappers", AI in Statistics, 2003.

Tsamardinos, I., et al., "Time and Sample Efficient Discovery of Markov Blankets and Direct Causal Relations", KDD 2003, 2002.

Aliferis, C.F., et al., "HITON, A Novel Markov Blanket Algorithm for Optimal Variable Selection", Proc. of 2003 Amer. Med. Informatics Assoc.(AMIA) Annual Symposium, 2003.

Tsamardinos, I., et al., "Scaling-Up Bayesian Network Learning to Thousands of Variables Using Local Learning Techniques", Vanderbilt Univ. Tech. Rpt. DSL TR-03-02, Mar. 2003.

Hutter, M., "Distribution of Mutual Information", Technical Report IDSIA-13-01, Dec. 15, 2001.

Margaritis, D., et al., "Bayesian Network Induction Via Local Neighborhoods", Carnegie Mellon Univ. Tech. Rpt. CMU-CS-99-134, Aug. 1999.

Duin, R.P.W., "Classifiers in Almost Empty Spaces", Proc. of 15th Int'. Conf. on Pattern Recognition, Sep. 3-8, 2000.

Aliferis, et al., "An Eval. of an Algorithm for Inductive Learning of Bayesian Belief Nets. Using Simulated Data Sets", Uncertainty in Art. Intel., 10th Conf. Proc., 1994.

Meek, C., "Strong Completeness & Faithfulness in Bayesian Networks," Uncertainty in Artifical Intelligence, 11th Conf. Proc., 1995.

Pearl, J., "Learning Structure From Data", Probabilistic Reasoning in Intelligent Systems: Networks of Plausible Inference, Chp. 8, pp. 381-414, (Sep. 1988).

Kohavi, R., et al., "The Wrapper Approach", Feature Extraction, Construction & Selection: A Data Mining Perspective, Chp. 3, pp. 33-50, (Jul. 1998).

Wang, H., et al., "Relevance Approach to Feature Subset Selection", Feature Extraction, Construction & Selection: A Data Mining Perspective, Chp. 6, pp. 85-99, (Jul. 1998).

Cooper, G., "An Overview of the Representation & Discovery of Causal Relationships Using Bayesian Networks", Computation, Causation, & Discovery, Chp. 1, pp. 3-62, (1999).

Pearl, J., "A Theory of Inferred Causation", Causality, Chp. 2, pp. 41-64, (Mar. 2000).

Spirtes, P., "Discovery Algorithms for Causally Sufficient Structures", Causation, Prediction, & Search (2d Ed.), Chp. 5, pp. 73-122, (Mar. 2001).

Neapolitan, R.E., "Constraint-Based Learning", Learning Bayesian Networks, Chp. 10, pp. 533-607, (Apr. 2003).

\* cited by examiner

| Dataset | Thrombin | Arrhythmia | Ohsumed | Lung Cancer | Prostate Cancer |
|---|---|---|---|---|---|
| Problem Type | Drug Delivery | Clinical Diagnosis | Text Categorization | Gene Expression Diagnosis | Mass-Spec Diagnosis |
| Variable # | 139,351 | 279 | 14,373 | 12,600 | 779 |
| Variable Types | binary | nominal / ordinal, continuous | binary and continuous | continuous | continuous (m/z clusters/peaks) |
| Target | binary | nominal | binary | binary | binary |
| Sample | 2,543 | 417 | 2000 | 160 | 326 |
| Vars-to-Sample | 54.8 | 0.67 | 7.2 | 60 | 2.4 |
| Evaluation Metric | ROC AUC | Accuracy | ROC AUC | ROC AUC | ROC AUC |
| Design | 1-fold c.v. | 10-fold c.v. | 1-fold c.v. | 5-fold c.v. | 10-fold c.v. |

FIG. 3

| Drug Discovery (Thrombin) | | | | |
|---|---|---|---|---|
| | UAF* | RFE | HITON | ALL |
| SVM | 96.12% | 93.29% | 93.23% | 93.69% |
| KNN | 87.25% | 89.71% | 92.23% | 88.21% |
| NN | N/A | 92.04% | 92.65% | N/A |
| Average | 91.69% | 91.68% | 92.7% | 90.95% |
| # of variables | 34837 | 8709 | 32 | 139351 |

FIG. 4

| Clinical Diagnosis (Arrhythmia) | | | | |
|---|---|---|---|---|
| | UAF* | B/F –DTI* | HITON* | ALL* |
| DTI | 73.94% | 72.85% | 71.87% | 73.94% |
| KNN | 63.22% | 63.45% | 65.30% | 63.22% |
| NN | 58.29% | 60.90% | 60.38% | 58.29% |
| Average | 65.15% | 65.73% | 65.85% | 65.15% |
| # of variables | 279 | 96 | 63 | 279 |

FIG. 5

| Text Categorization (OHSUMED) | | | | |
|---|---|---|---|---|
| | IG | $X^2$ | HITON | ALL* |
| SVM | 82.43% | 85.91% | 82.85% | 90.50% |
| SBCtc | 84.18% | 86.23% | 85.10% | 84.25% |
| KNN | 75.55% | 81.76% | 80.25% | 77.56% |
| NN | 82.47% | 85.27% | 83.97% | N/A |
| Average | 81.16% | 84.79% | 83.04% | 84.10% |
| # of variables | 224 | 112 | 34 | 14373 |

FIG. 6

| Gene Expression Diagnosis (Lung Cancer) | | | | |
|---|---|---|---|---|
| | UAF* | RFE* | HITON* | ALL* |
| SVM | 99.32% | 98.57% | 97.83% | 99.07% |
| NN | 99.63% | 98.70% | 98.92% | N/A |
| KNN | 95.57% | 91.49% | 96.06% | 97.59% |
| Average | 98.17% | 96.25% | 97.60% | 98.33% |
| # of variables | 330 | 19 | 16 | 12,600 |

FIG. 7

| Mass-Spectrometry Diagnosis (Prostate Cancer) | | | | |
|---|---|---|---|---|
| | UAF* | RFE* | HITON* | ALL* |
| SVM | 98.50% | 98.95% | 99.10% | 99.40% |
| NN | 98.62% | 98.78% | 97.95% | 99.27% |
| KNN | 77.52% | 86.53% | 91.36% | 76.94% |
| Average | 91.55% | 94.75% | 96.14% | 91.87% |
| # of variables | 706 | 87.2 | 15.8 | 779 |

FIG. 8

| Averages Over All Tasks | | | |
|---|---|---|---|
| | Av. Over Baseline Algorithms | HITON | ALL |
| Av. Perf. over classifiers | 86.1% | 87.1% | 86.1% |
| Av. variable # | 4540 | 32.3 | 33,476.4 |
| Av. reduction | x 8.3 | x 1123.7 | x 1 |

FIG. 9

| Algorithm | Sensitivity | Specificity | Distance |
|---|---|---|---|
| PC | 98% | 93% | 7% |
| TPDA | 91% | 96% | 9% |
| SC/MI | 98% | 94% | 6% |
| SC/Sc | 96% | 94% | 7% |
| MMBN | 98% | 95% | 5% |

FIG. 10

| Algorithm | Sens. | Spec. | Dist. | Time |
|---|---|---|---|---|
| MMBN | 81% | 99.9% | 18% | 62 hours |

FIG. 11

| Dataset | Sample Size | | | | |
|---|---|---|---|---|---|
| | 300 | 500 | 700 | 1,000 | 5,000 |
| ALARM | W | W | W | W | W |
| Pigs | W | W | W | W | W |
| Hailfinder | W | L | W | W | W |
| Insurance | L | W | W | W | W |
| Win95PTS | L | L | L | L | W |
| ALARM-5K | W | W | W | W | W |
| Pigs-5K | W | W | W | W | W |
| Hailfinder-5K | L | W | W | W | W |
FIG. 12
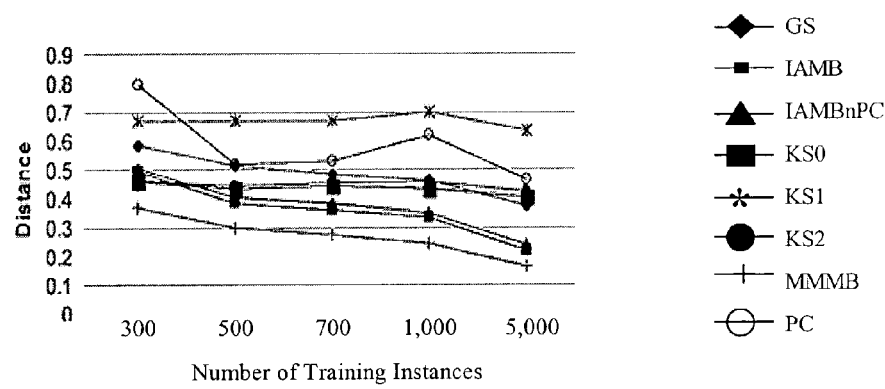
FIG. 13
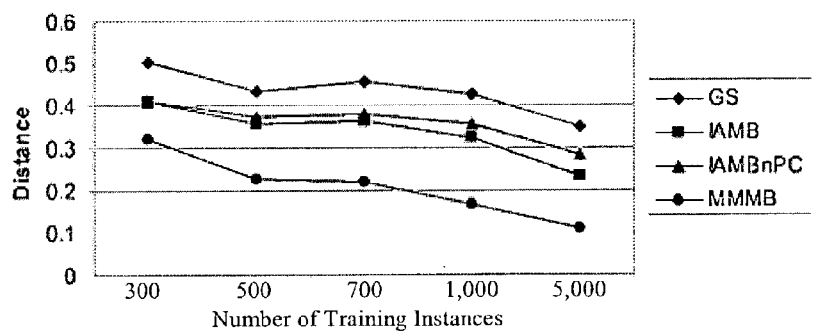
FIG. 14

METHOD, SYSTEM, AND APPARATUS FOR CASUAL DISCOVERY AND VARIABLE SELECTION FOR CLASSIFICATION

CROSS-REFERENCE TO RELATED APPLICATIONS

This application claims priority to U.S. provisional patent application Ser. No. 60/380,647 filed in the United States Patent and Trademark Office on May 15, 2002, and to U.S. provisional patent application Ser. No. 60/420,877 filed in the U.S. Patent and Trademark Office on Oct. 24, 2002.

STATEMENT REGARDING FEDERALLY SPONSORED RESEARCH

Not applicable.

BACKGROUND

1. Technical Field

The present invention relates to data processing and analysis and, more particularly, to causal discovery and feature selection for classification.

2. Description of the Related Art

Advances in computing technology have allowed researchers across many fields of endeavor to collect and maintain vast amounts of observational statistical data such as clinical data, biological patient data, data regarding access of web sites, financial data, and the like. Using computational methods, these data can be processed in order to learn to classify a particular target variable of interest. For example, a patient can be classified into a high or low risk group given his or her demographic data, historical data, lab tests, etc.

As only recently proved, under certain conditions the observational statistical data also can be processed to induce causal relations among the observed quantities, also referred to as variables or features. For example, by processing such observational statistical data, it can be induced that smoking probabilistically causes lung cancer, that the placement of an item in a grocery store increases sales, or that increasing the amount of vacation time provided to factory workers increases productivity. Notably, the aforementioned causal relationships are induced without controlled experiments. See Spirtes, P., C. Glymour, and R. Schemes, *Causation, Prediction, and Search*, Cambridge, Mass., London, England: The MIT Press (Second ed. 2000).

While some of these data sets may include only 10–100 or so variables, others can include upwards of hundreds of thousands of variables. Within data networks of thousands of variables, variable selection—that is the identification of a minimal, or close to minimal, subset of variables that best predicts the target variable of interest—can be difficult. The identification of the relevant variables that best predict a target variable, however, has become an essential component of quantitative modeling, data-driven construction of decision support models, and computer-assisted discovery.

Similarly, the identification of the variables that directly cause or are caused by the target variable is difficult. In this context, if A is said to directly cause B, no other variables from the set of observed variables in the data causally intervene between A and B. The problem of identifying a causal neighborhood around the target variable, that is variables that are directly caused or cause the target variable, is referred to as local causal discovery. The identification of all direct causal relations among all variables is referred to as global causal discovery. The identification of the direct causes and direct effects of the target variable is extremely important with respect to manipulating various systems. For example, in order to build a drug to treat a disease, one needs to know what causes the disease, not simply how to predict or diagnose the occurrence of the disease (i.e., classify the patient as having the disease or not).

The problem of variable selection for classification in biomedicine has become more pressing than ever with the emergence of such extremely large data sets. The number of variables in these data sets, as noted, can number into the hundreds of thousands, while the sample-to-variable ratio of the data sets remains small in comparison. Such data sets are common in gene-expression array studies, proteomics, and computational biology, for example where one attempts to diagnose a patient given as variables the expression levels of tens of thousands of genes, or the concentration level of hundreds of thousands of protein fragments. With regard to medical diagnosis, the identification of relevant variables, for example as derived from lab tests, for a particular condition can help to eliminate redundant tests from consideration thereby reducing risks to patients and lowering healthcare costs. Similarly, in biomedical discovery tasks, identification of causal relations can allow researchers to conduct focused and efficient experiments to verify these relations.

Other domains such as text-categorization, information retrieval, data mining of electronic medical records, consumer profile analysis, and temporal modeling share characteristics with the aforementioned domains. In particular, these domains also have a very large number of variables and a small sample-to-variable ratio. Identifying a reduced but still predictive variable set can significantly benefit computer, statistical, and paper-based decision support models pertaining to these fields in terms of understandability, user acceptance, speed of computation, and smoother integration into clinical practice and application in general.

The theory of causal discovery from observational data is based on Bayesian Networks, specifically a special class of Bayesian Networks, known as Causal Bayesian Networks, or Causal Probabilistic Networks (CPNs). In a causal Bayesian Network, an arc (edge) from a variable A to a variable B, means that A is causing B. The same theory also can be used for solving variable selection problems. Bayesian Networks are mathematical objects that capture probabilistic properties of the statistical data. One component of a Bayesian Network is a graph of causal relations depicting that A is directly causing B. Further details regarding Bayesian Network theory are provided in Neapolitan, R. E., *Probabilistic Reasoning in Expert Systems. Theory and Algorithms*, John Wiley and Sons (1990).

Bayesian Networks provide a useful tool for analyzing large data sets derived, for example, from the aforementioned domains. More particularly, Bayesian Networks provide a conceptual framework for problem solving within areas such as prediction, classification, diagnosis, modeling, decision making under uncertainty, and causal discovery. As such, Bayesian Networks have been the subject of a significant amount of research which has yielded a variety of analysis tools and techniques.

Still, known techniques for inducing a Bayesian Network, and thus the causal relations, from statistical data and determining the relevant variables for the prediction of a target variable are limited. That is, known techniques for determining which variables influence a selected target variable are limited to operating upon data sets having only several hundred variables at most. Such conventional techniques are unable to scale upward to effectively process data sets having more than several hundred variables. Accordingly, conventional Bayesian Network analysis techniques are not able to work effectively upon larger data sets such as those derived from gene-expression array studies, proteomics, computational biology, text-categorization, information retrieval, data mining of electronic medical and financial records, consumer profile analysis, temporal modeling, or other domains.

SUMMARY OF THE INVENTION

The present invention provides a solution for variable selection, classification, local causal discovery, and global causal discovery. The inventive arrangements disclosed herein can scale upward to process data sets with hundreds of thousands or more variables in a reasonable amount of time. As such, the present invention can be applied on data sets derived from a variety of different domains including, but not limited to, gene-expression array studies, proteomics, computational biology, text-categorization, information retrieval, data mining of electronic medical records or financial records, consumer profile analysis, and temporal modeling.

With regard to variable selection, the ability to determine the smallest subset of variables that provide maximum predictive accuracy for a target variable allows for smaller predictive models. Such models are easier to comprehend by humans and easier to construct by computers. Also, since fewer variables need to be observed, the cost of observation and data collection as well as the amount of computational time needed to use such models both can be decreased. This further can translate into decreased risk to patients within the context of medical procedures. The Markov Blanket can be used to solve feature selection problems as it is the smallest subset with maximal classification or regression performance. For a more detailed discussion, see I. Tsamardinos and C. F. Aliferis, *Towards Principled Feature Selection. Relevance, Filters, and Wrappers*, AI in Statistics (2003).

Regarding local causal discovery, determining the direct causes and direct effects of a target variable of interest facilitates the identification and/or determination of mechanisms for manipulating the target variable. Such is the case, for instance, in the context of drugs for treatment of disease, policies to affect behavior in organizations, or marketing actions to increase sales. The ability to accurately and efficiently perform local causal discovery facilitates the creation of very specific hypotheses that can be experimentally tested and verified. For example, the number of required experiments to discover the true causal structure surrounding a disease is lessened if a hypothesis is developed which suggests that only five out of 10,000 genes are directly causing the disease.

Determining all direct causal relations among all observed variables, referred to as global causal discovery, can be applied to a number of tasks such as the construction of decision support systems and the discovery of pathways of gene interactions in the genome.

One aspect of the present invention can include a method of determining a local causal neighborhood of a target variable from a data set. The data set can be prepared for processing, or preprocessed. The method can include (a) identifying variables of the data set as candidates of the local causal neighborhood using statistical characteristics; (b) including the identified variables within a candidate set; (c) removing false positive variables from the candidate set according to further statistical characteristics applied to each variable of the candidate set; and (d) identifying the remaining variables of the candidate set as the local causal neighborhood of the target variable. Notably, the data can be represented by a Bayesian Network.

According to one embodiment of the present invention, the statistical characteristics are determined by identifying the variable with the maximum minimum association over all subsets of size up to at least a predetermined value for the candidate set. The statistical characteristics can include tests of conditional independence and measures of association. For example, the test of conditional independence and measures of association can include the Mutual Information criteria, the $G^2$ statistical test, the Fisher z test, Bayesian scoring metrics, parametric mutual information, proportional reduction in variation, feed-forward neural networks, K-nearest neighbors, Support Vector Machines, and a generalized linear model, etc. Notably, step (a) can identify variables which maximize the univariate association with the target variable.

In another embodiment, the further statistical characteristics can include further tests of conditional independence. The tests of conditional independence can include, but are not limited to the Mutual Information criteria, the $G^2$ statistical test, the Fisher z test, Bayesian scoring metrics, parametric mutual information, proportional reduction in variation, feed-forward neural networks, K-nearest neighbors, Support Vector Machines, and a generalized linear model, etc. If so configured, variables can be admitted into the candidate set and false positive variables can be removed from the candidate set in an interleaved fashion.

The present invention further can distinguish among the variables of the candidate set to determine direct causes, direct effects, and spouses of the target variable; and identify potential hidden confounders. Steps (a), (b), (c), and (d) can be performed for each variable of the data set until all variables have served as the target variable to identify a local causal neighborhood for each variable. Accordingly, the local causal neighborhoods determined can be combined to determine a global causal theory of the data set.

Additionally, spouses of the target variable can be added to the local causal neighborhood; direct causes and direct effects of all direct causes and direct effects of the target variable can be added; and direct causes of the direct causes of the target variable, the direct effects of the direct causes of the target variable, and the direct effects of the direct effects of the target variable can be removed from the local causal neighborhood. Variables that do not affect the predictive accuracy of the target variable can be removed as well. Using cross-validation, a subset of all possible subsets of the candidate set with maximum predictive accuracy can be identified.

Another aspect of the present invention can include a system for determining a local causal neighborhood of a target variable from a data set. The system can include means for identifying variables of the data set as candidates of the local causal neighborhood using statistical characteristics; means for including the identified variables within a candidate set; means for removing false positive variables from the candidate set according to further statistical characteristics applied to each variable of the candidate set; and means for identifying the remaining variables of the candidate set as the local causal neighborhood of the target variable. Notably, the data set can be represented by a Bayesian Network. Also, the system can include means for preprocessing the data set which are operative prior to the means for identifying variables of the data set as candidates.

According to one embodiment of the present invention, the statistical characteristics are determined by identifying the variable with the maximum minimum association over all subsets of size up to at least a predetermined value for the candidate set. The statistical characteristics can include tests of conditional independence and measures of association. As noted, the tests of conditional independence and measures of association can include, but are not limited to, the Mutual Information criteria, the $G^2$ statistical test, the Fisher z test, Bayesian scoring metrics, parametric mutual information, proportional reduction in variation, feed-forward neural networks, K-nearest neighbors, Support Vector Machines, and a generalized linear model, etc. The means for identifying variables of the data set as candidates of the local causal neighborhood can identify variables which maximize the univariate association with the target variable.

In another embodiment, the further statistical characteristics can include further tests of conditional independence including, but not limited to, the Mutual Information criteria, the $G^2$ statistical test, the Fisher z test, Bayesian scoring metrics, parametric mutual information, proportional reduction in variation, feed-forward neural networks, K-nearest neighbors, Support Vector Machines, and a generalized linear model, etc. Regardless, the variables can be admitted into the candidate set and false positive variables can be removed from the candidate set in an interleaved fashion if the system is so configured.

The system also can include means for distinguishing among the variables of the candidate set to determine direct causes, direct effects, and spouses of the target variable; and means for identifying potential hidden confounders. Additionally, the system can include means for processing each variable of the data set as the target variable to determine a local causal neighborhood for each variable; and means for combining the local causal neighborhood of each target variable to determine a global causal theory of the data set.

The system further can include means for adding spouses of the target variable to the local causal neighborhood; means for adding direct causes and direct effects of all direct causes and direct effects of the target variable; and means for removing direct causes of the direct causes of the target variable, the direct effects of the direct causes of the target variable, and the direct effects of the direct effects of the target variable. Accordingly, the system can include means for removing variables from the candidate set which do not affect the predictive accuracy of the target variable. The means for removing variables can include means for identifying a subset of all possible subsets of the candidate set with maximum predictive accuracy as determined using cross-validation.

BRIEF DESCRIPTION OF THE DRAWINGS

There are shown in the drawings, embodiments which are presently preferred, it being understood, however, that the invention is not limited to the precise arrangements and instrumentalities shown.

FIG. 3 is a table summarizing characteristics of some of the data sets used for purposes of experimentation regarding the inventive arrangements disclosed herein.

FIGS. 4–9 are tables summarizing results of using the inventive arrangements as described with reference to FIG. 2 in determining small variable sets for the various tasks and/or data sets shown.

FIG. 10 is a table illustrating comparative results of various processing techniques as applied to the ALARM data set.

FIG. 11 is a table illustrating results obtained from execution of one embodiment of the present invention, where the statistics reported are on the task of edge rediscovery.

FIG. 12 is a table illustrating results determined from applying an embodiment of the present invention to data sets of varying sample sizes.

FIG. 13 is a graph illustrating a comparison of various embodiments of the present invention with conventional methods for determining the Markov Blanket of T on small Bayesian Networks.

FIG. 14 is a graph illustrating a comparison of various embodiments of the present invention with conventional methods for determining the Markov Blanket of T on large Bayesian Networks.

DETAILED DESCRIPTION OF THE INVENTION

Figure 1:
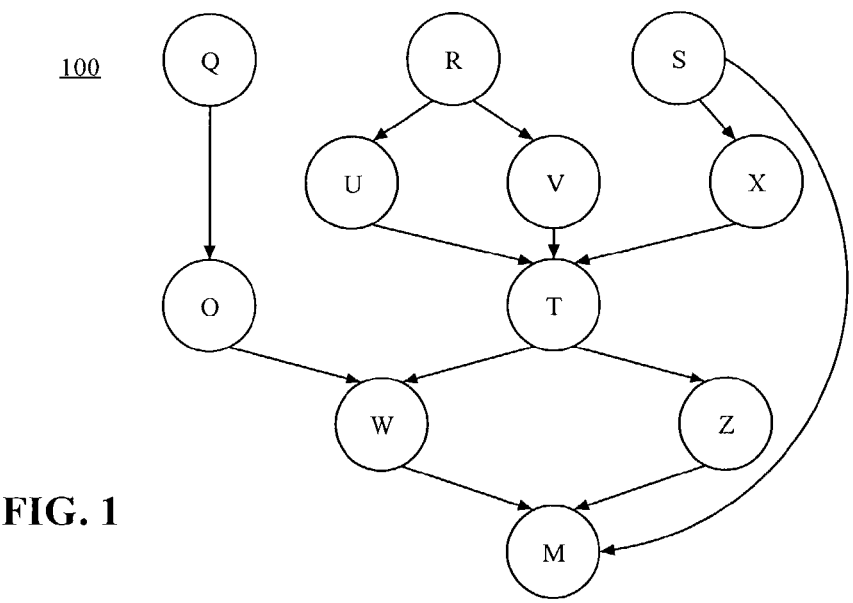
FIG. 1 is a schematic diagram illustrating an acyclic graph of an exemplary Bayesian Network which can be processed in accordance with the inventive arrangements disclosed herein.

The present invention provides a method, system, and apparatus for performing local and global causal discovery and variable selection for classification from statistical data. As used herein, the terms "classification accuracy" or "prediction accuracy" refer to classification and/or regression performance as determined using appropriate measures, including, but not limited to, 0/1 loss, mean-squared error, area under the ROC curve, area under the 11-point precision-recall curve, etc. The various embodiments disclosed herein are provably correct in data generating processes which can be faithfully represented using a Bayesian Network. If the data generating process cannot be faithfully captured by a Bayesian Network, the present invention can return an approximation solution to the problem at hand. Each of the various references cited herein is fully incorporated by reference.

More particularly, the present invention can perform local causal discovery to determine the direct causes and direct effects of a given variable of interest as well as the Markov Blanket, referring to the direct causes, direct effects, and direct causes of direct effects, of the variable of interest. Global causal discovery can be performed to determine the global network by combining local portions of the network, referred to as local neighborhoods. Once the values of the Markov Blanket variables are known, all other variables become superfluous for prediction and classification or regression of the target variable of interest. Thus, the present invention further performs variable selection as local causal discovery can be used for selecting a minimal set of the maximally predictive set of variables for classification of the target variable.

The following definitions are useful in understanding the various embodiments disclosed herein. Capital letters indicate single variables, lower case letters indicate values of variables, and bolded letters denote sets of variables.

P(T=t|X=x) denotes the probability of variable T assuming the value t given that variable X has value x. P(T|X) denotes the set of P(T=t|X=x) for all possible values of t and x.

Two variables X and Y are conditionally independent given the set of variables Z, if and only if P(T=t|X=x, Z=z)=P(T=t|Z=z), for each possible t, x, z, denoted as I(X; T|Z).

A Bayesian Network is a directed acyclic graph over a set of variables (also called nodes) and a joint probability distribution J over those variables. The graph of the network and the distribution J are connected by the Markov Condition stating that a node is conditionally independent of each non-descendant node given that node's parents. A descendant can be defined as follows: A is a descendant of B if and only if there is a directed path from B to A. Because of the Markov Condition, the distribution J can be defined by the directed acyclic graph and by specifying for each node its probability distribution given each node's parents. If a node does not have any parents, that node's prior distribution can suffice.

A Bayesian Network N is faithful to a probability distribution J, if and only if every conditional independence entailed by the graph of N and the Markov Condition is also present in J. A Bayesian Network N is faithful if the Bayesian Network is faithful to its corresponding distribution J.

A node W of a path p is a collider if p contains two incoming edges into W. A path p from node X to some node Y is blocked by a set of nodes Z, if any of the following is true: (1) there is a non-collider node on p that belongs to Z; and (2) no collider nodes of p and none of their descendants belong in Z.

Two nodes X and Y are d-separated by Z if and only if every path from X to Y is blocked by Z. This condition called "d-separation" will be denoted as Dsep(X; Y|Z).

The Markov Blanket of T, denoted as MB(T), is a minimal set conditioned on which all other nodes are independent of T. In a faithful Bayesian Network, MB(T) is the set of parents, children, and spouses (parents of common children) of T.

If a data generating process can be captured by a faithful Bayesian Network, and in addition, for every pair of observed variables every confounding variable that is a common cause is also observed (this condition is called Causal Sufficiency) then the set of parents and children of the target T, coincide with the set of direct causes and direct effects of T; also the Markov Blanket coincides with the set of direct causes, direct effects, and direct causes of direct effects of T. Because of this property, the phrase "direct cause" will be used in place of the phrase "parent of" T, and "direct effect" in place of "child of" T.

FIG. 1 is a schematic diagram illustrating an acyclic graph 100 of an exemplary Bayesian Network in accordance with the inventive arrangements disclosed herein. Data sets derived from gene-expression array studies, proteomics, computational biology, text-categorization, information retrieval, mining of electronic medical records, consumer profile analysis, temporal modeling, and the like can be represented using a Bayesian Network. For example, in a gene-expression study, each variable or node in the Bayesian Network would represent the expression level of a specific gene, while the target variable may express the fact that the cell belongs to a patient with or without a disease.

As shown in FIG. 1, node T has parents U, V, and X, meaning that T shares an edge U→T, V→T, and X→T. Equivalently, T can be said to be a child of U, V, and X. The node O is a spouse of T as node O shares a common child W with node T. Nodes such as R and S are ancestors of T in that there is a direct path from node R or S to node T. Similarly, node T can be referred to as a descendant of nodes R or S.

Figure 2:
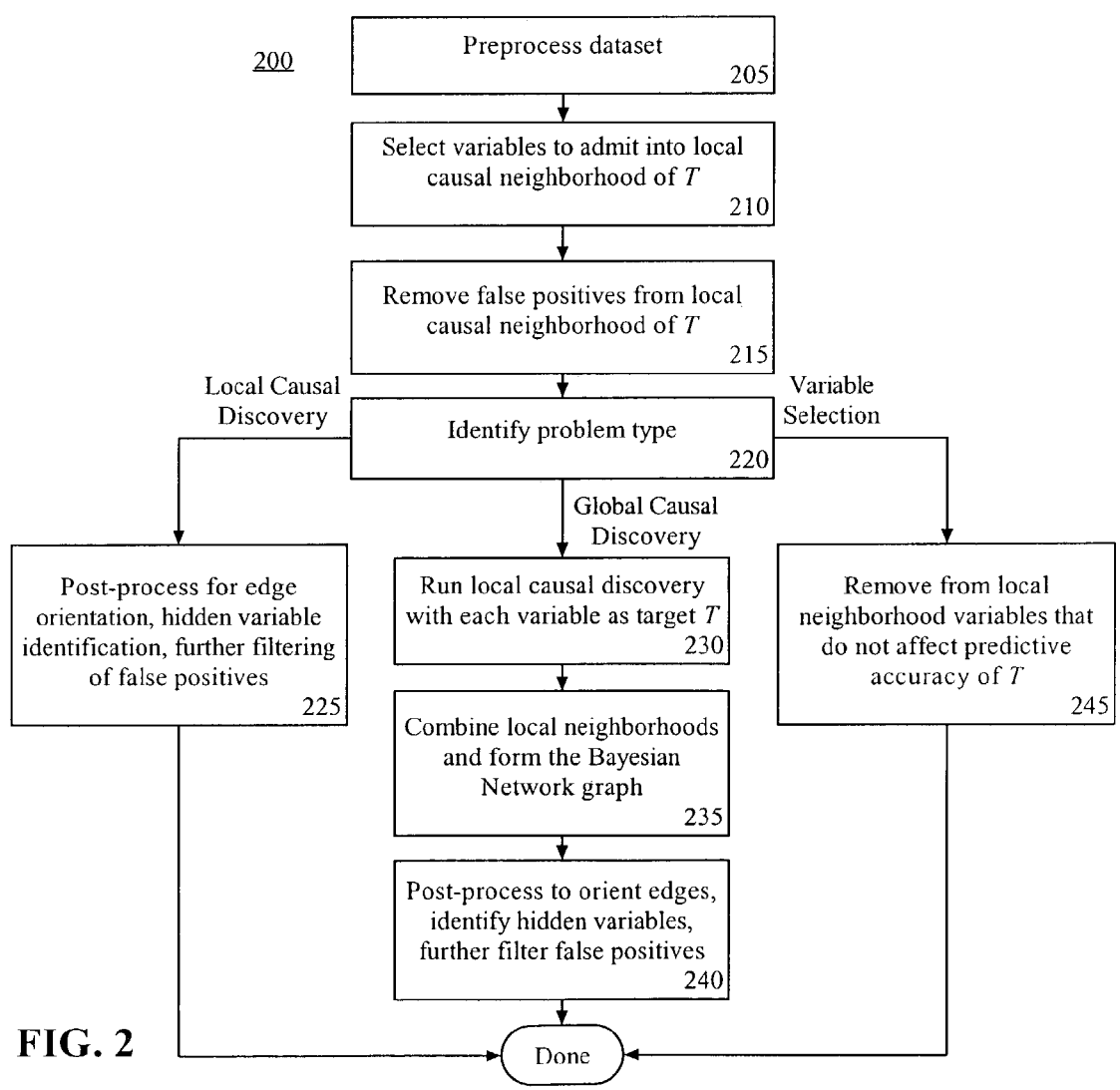
FIG. 2 is a flow chart illustrating a method of identifying the local causal neighborhood of a target variable T, the global causal theory of the data distribution, or a minimal set of predictors of T with maximal predictive power in accordance with the inventive arrangements disclosed herein.

FIG. 2. is a flow chart illustrating a method 200 of identifying the local causal neighborhood of a target variable T, where the neighborhood is defined as the direct causes and direct effects of T or the Markov Blanket of T, the global causal theory (i.e., the Bayesian Network) of the data distribution, or a minimal set of predictors of T with maximal predictive power.

It should be appreciated that selected steps of the method 200 test conditional independence and measure strengths of association between variables. According to one embodiment of the present invention, such tests and measures can be implemented as follows: a variable X is independent of a variable Y conditioned on a set of variables Z, if their mutual information denoted as MI(X;T|Z), is below an arbitrary threshold value. For example, the threshold value can be determined empirically using a nested-cross validation design. MI(X;T|Z) can be calculated by:

$$MI(X;Y|Z) = \sum_{x,y,z} P(x, y, z) \log \frac{P(x, y|z)}{P(x|z)P(y|z)}$$

The value of MI(X; Y|Z) also can serve as a measure of the strength of association of X with Y given Z.

According to another embodiment of the present invention, conditional independence can be determined by calculating the $G^2$ statistic as described in Spirtes, P., C. Glymour, and R. Scheines, *Causation, Prediction, and Search*, Cambridge, Mass., London, England: The MIT Press (Second ed. 2000). Generally, the $G^2$ statistic is used to test the hypothesis that an observed dependence or association between two discrete variables is due to chance (i.e., due to variation in the sampling process) or is systematic (i.e., representative of the association in the population from which the sample is obtained). One starts from a null hypothesis representing no association in the population. The hypothesis is then rejected or accepted on the basis of how the value of the $G^2$ statistic is distributed in repeated samplings. Notably, the $G^2$ statistic with alternative corrections of degrees of freedom can be used.

The conditional independence of X with Y given Z can be determined by calculating the $G^2$ statistic under the null hypothesis that X is independent of Y given Z. The value of the $G^2$ statistic is distributed as a chi-square distribution with appropriate degrees of freedom. The p-value of the chi-square test for rejecting the null hypothesis can serve as a measure of association between X and Y given Z, where the smaller the p-value, the stronger the association. Also, if the p-value is smaller than a threshold, for example 5% as is commonly used in classical statistical testing practice, then one can reject the null-hypothesis of independence and assume that X and Y are dependent given Z. It should be appreciated, however, that different thresholds can be utilized given the characteristics of the data. Thus, by thresholding the p-value a test of independence can be obtained as standard statistical practice dictates.

The aforementioned exemplary embodiments have been provided for purposes of illustration. As such, the present invention is not intended to be limited to only those exemplary tests of conditional independence and measures of association disclosed. Rather, those skilled in the art will recognize that any suitable test of conditional independence and measure of association can be used.

For example, other alternative and appropriate criteria for distribution of variables as dictated by statistical history can include, but are not limited to, Fisher's z test for multivariate normal distributions as disclosed in Spirtes, et al., *Causation, Prediction, and Search*, and Bayesian scoring metrics, excluding the inclusive scoring metric, as referenced in D. Heckerman, *A tutorial on learning Bayesian networks*, Technical Report MSR-TR-95-06, Microsoft Research (March 1995). Still, other alternatives can include Parametric Mutual Information as referenced in M. Hutter, *Distribution of Mutual Information*, Technical report IDSIA-13-01 (2001); proportional reduction in variation as referenced in Agresti, A., *Categorical Data Analysis*, Probability and Mathematical Statistics, ed. V. Barnett, et al., Gainesville, Fla., John Wiley and Sons (1990), or entropy as referenced in Cover, T. M., and J. A. Thomas, *Elements of Information Theory*, Wiley, New York (1991).

A variety of other estimators can be used to estimate variation of the target variable, including, but not limited to, Feed-forward Neural Networks (NN's) as disclosed in Mitchell, T. M., *Machine Learning*, New York, McGraw-Hill Co., Inc. (1997); K-Nearest Neighbors (KNN) as described in Weiss S. M., C. A. Kulikowski, *Compuler Systems that Learn*, Morgan Kaufman (1991); Support Vector Machines (SVM) as described in Scholkopf, B., C. J. C. Burges, and A. J. Smola, eds. *Advances in Kernel Methods: Support Vector Learning*, The MIT Press (1999); and the Generalized linear model.

Accordingly, in the following description, such tests can determine whether X is independent of Y given Z, denoted as I(X; Y|Z), and the measure of association of X with Y given Z, denoted as assoc(X; Y|Z).

Continuing with FIG. 2, the method 200 can begin in step 205 where a given data set can be preprocessed. For example, the data set can be organized into tabular form. The data set also can be normalized and any missing values can be derived through imputation. Further, the data set can be discretized and any outliers can be removed. Other transformations also can be applied on the data such as Principal Component Analysis where a number of possibly correlated variables are transformed into a smaller number of uncorrelated variables called principal components.

If the size of the conditioning set is large, or variables have a large number of possible values, then the number of parameters to be estimated in order to perform the statistical tests described above may be too large to reliably estimate with the available sample. In that case, an alternative can be to abstain from performing the conditional independence tests, and instead assume that such tests return appropriate default values.

In step 210, variables can be selected for admission into the local causal neighborhood of T. For example, an empty candidate local neighborhood, denoted as CLN can be defined. Any variable X that maximizes assoc(X; T|CLN) can be admitted into CLN. Variables can be continually admitted until I(X;T|CLN) for every X not in CLN, and X not equal to T. The resulting CLN is a superset of the Markov Blanket of T. This technique is further illustrated in the Iterative Associative Markov Blanket (IAMB) embodiment of the present invention shown in the Appendix.

According to another embodiment of the present invention, after an empty candidate local neighborhood CLN is defined, the variables can be ordered according to assoc(X; T). The next variable in the ordering that is not I(X;T|CLN) can be admitted into CLN. Variables can be continually admitted into CLN until all variables have been examined. The resulting CLN is a superset of the Markov Blanket of T. Notably, while conventional techniques utilize a static heuristic when considering next variables during this phase (See D. Margaritis and S. Thrun, *Bayesian network induction via local neighborhoods*, Advances in Neural Information Processing Systems 12 (NIPS) (1999) (discussing the Grow-shrink technique)), the present invention utilizes a dynamic heuristic in the IAMB, MMMB, MMPC embodiments, whereas in the HITON embodiment the drawbacks of a static heuristic are overcome with the use of a different backward conditioning phase.

Still, in another embodiment of the present invention, an empty candidate local neighborhood CLN can be defined. Any variable X that maximizes the minimum assoc(X; T|s) over all subsets s of size up to a number k of CLN can be admitted into CLN. The resulting CLN is a superset of the direct causes and direct effects of T. This technique is further illustrated in the Max Min Parents and Children (MMPC) embodiment of the present invention shown in the Appendix.

Possible methods for determining a value for the parameter k during the variable elimination phase of the present invention include setting k to the maximum value allowed by the time available for data analysis wherein larger values of k lead to longer analysis times. Alternatively, k can be set to a value determined by domain-dependent properties. For example, with respect to gene regulatory pathways of higher organisms, k is expected to be approximately 8 as referenced in Arnone M. I. and Davidson E. H., *The hardwiring of development: organization and function of genomic regulatory systems*, Development 12 (4): 1851–1864 (1997).

Still, k can be set to the value determined by the following heuristic rule: k is the maximum value so that the quantity, that is the number of free parameters to be estimated from the data times a factor of 10, is closest to the available sample. The number of free parameters can be estimated as the number of cells in the contingency table defined by the discrete or discretized variables X, T, V1, . . . Vn minus 1. Here, X is the variable considered for inclusion or exclusion from the local neighborhood or Markov Blanket, T is the target variable, and Vk are the conditioning variables. This heuristic rule is grounded on experiments conducted in statistics and other fields as referenced in Robert P. W. Duin, *Classifiers in Almost Empty Spaces*, Delft University of Technology, International Conference on Pattern Recognition (ICPR '00), Vol. 2, Barcelona, Spain (Sep. 3–8, 2000), as well as in other references noted therein. It should be appreciated, however, that rather than using a factor of 10, the free parameters can be multiplied by another suitable factor as determined, for example, using cross-validation.

Yet another method of determining k can include cross-validation. For example, a nested cross-validation design can be applied to find the smallest value of k that yields the best predictive performance or other suitable evaluation metric.

In any case, other methods of determining a value for k in the variable elimination phase of the present invention can be used. Accordingly, the present invention is not intended to be limited to only those exemplary methods of determining k disclosed herein. Rather, any suitable method can be used. Such can be the case given particular data characteristics such as the functional form and strength of association of variables.

In step 215, false positive variables can be removed from the local causal neighborhood of T. In one embodiment, the CLN of step 210 can be processed to remove a variable X if I(X;T|CLN\{X}). This can be repeated for all remaining variables in CLN. If the initial CLN was a superset of MB(T), the final CLN is the Markov Blanket of T. The technique is further illustrated in the IAMB embodiment shown in the Appendix.

According to another aspect of the present invention, step 215 can be performed by removing from the CLN of step 210 a variable X if I(X;T|s), where s is any subset of size up to a number k of CLN. The value of k can be determined as noted above. The final CLN is the set of direct causes and direct effects of T. This technique is further illustrated in the HITON and MMPC embodiments of the present invention shown in the Appendix.

Although steps 210 and 215 are described as being performed in serial fashion, it should be appreciated that steps 210 and 215 can be performed in an interleaved fashion such that candidate variables are added and deleted to the CLN one at a time rather than adding all candidate variables and then removing all false positive variables. In any case, the various alternative steps of the method 200 need not be implemented on a one to one basis, for example where first alternative of step 210 is used only with the first alternative of step 215. Rather, each of the various alternative steps can be intermixed with one another.

In the MMMB embodiment, step 210 results in a CLN that is a super set of the direct causes and direct effects of T. Step 215 then removes all false positives (non-direct causes or direct effects of T) from CLN. As a result, after completion of step 215, CLN is the set of direct causes and direct effects of T.

Because the MMMB embodiment identifies the Markov Blanket, it is necessary to add the spouses of T to CLN. Toward that end, and according to an alternative embodiment of the MMMB technique, step 210 can be repeated and the set of direct causes and direct effects of all direct causes and direct effects of T can be added to CLN in a recursive fashion. This is a superset of MB(T) since it contains the spouses of T. Accordingly, step 215 can be repeated to remove false positives from CLN, in particular the direct causes of the direct causes of T, the direct effects of the direct causes of T, and the direct effects of the direct effects of T.

In step 220, a determination can be made as to the type of problem, and thus, processing, to be solved and/or applied. If local causal discovery is to be performed, the method can proceed to step 225. If global causal discovery is to be performed, the method can continue to step 230. If variable selection is to be performed, the method can proceed to step 245.

In step 225, in the case where local causal discovery is to be performed, the CLN can be processed further. In particular, to orient the edges, i.e., to distinguish among the variables in the MB(T) to determine which ones are the direct causes, the direct effects, and which are the spouses of T, the PC technique (PC), as disclosed in Spirtes et al., *Causation, Prediction, and Search*, can be run on the CLN. PC starts with a fully connected un-oriented Bayesian Network graph and has three phases. In phase I, PC finds undirected edges by using the criterion that variable A has an edge to variable B if and only if for all subsets of features there is no subset S, so that A becomes independent of B given S. In phases II and III, PC orients the edges by applying orientation rules until no more edges can be oriented. PC may not orient some edges, in which case the output will contain un-oriented edges and correspond to a class of structurally equivalent Bayesian Networks.

To identify potential hidden confounders of the variables in the MB(T) the FCI technique (FCI), as disclosed in Sprites, et al., *Causation, Prediction, and Search*, can be applied. FCI extends PC in that it does not require that all common causes of any two variables have been measured (an assumption known as causal sufficiency). Instead, FCI searches implicitly in the space of all possible Bayesian Networks that contain unobserved (hidden) variables. The output of FCI is a so-called POIPG (partially-oriented inducting path graph), i.e. a representation of a class of Bayesian Networks that contain hidden variables relative to the ones measured in the data set. By examining such graphs, causal relationships that are mediated by unmeasured common causes can be revealed.

If the causal sufficiency condition does not hold, false positives still may be included in the output of the IAMB, MMPC, and other embodiments of the present invention. If, however, hidden confounders are identified, some of the confounded variables can be correctly removed from potential direct causes of T as false positives. After completion of step 225, the method can end.

In step 230, where global causal discovery is to be performed, local causal discovery can be run with each variable of the CLN serving as the target T. For example, the MMPC embodiment of the present invention can be executed for each variable of the CLN, where each variable serves as the target variable. Step 235 can be implemented by considering all edges discovered in the local neighborhood of any variable as being direct causes or direct effects of that variable. The calculation of the set Edges according to the MMBN embodiment of the present invention is illustrated in the Appendix. Briefly, the direct edges (to and from) each variable are found by using the MMPC embodiment of the present invention as previously described. An edge between variables A and B is accepted if MMPC has found an edge between them when run using variable A as a target or when run using variable B as a target.

In step 240, the CLN can be post-processed to orient edges, identify hidden variables, and further filter false positives. For example, step 240 can be implemented, at least in part, using a Bayesian search-and-score procedure such as the hill-climbing search using the BDEu scoring method, constrained in the space of only the edges identified in the previous steps, in order to direct all edges and remove potential false positives. The hill-climbing search and BDEu scoring method is substantially described in Friedman, N., I. Nachman, and D. Pe'er, *Learning Bayesian Network Structure from Massive Data sets. The "Sparse Candidate" Algorithm*, Proc. Fifteenth Conference on Uncertainty in Artificial Intelligence (UAI) (1999); and D. Heckerman, *A tutorial on learning Bayesian networks*.

If a determination was made in step 220 that variable selection is to be performed, the method can proceed to step 245. In step 245, those variables which do not affect the predictive accuracy of T can be removed from the local neighborhood. According to one embodiment, a search can be performed in the space of variable subsets of the MB(T) which was identified in step 215 for the smallest subset that gives the best predictive accuracy for T. The predictive accuracy for T for a given classifier (e.g. Artificial Neural Networks) can be estimated by a cross-validation procedure. A nested stratified cross-validation design as described in Weiss S. M., C. A. Kulikowski, *Computer Systems that Learn*, Morgan Kaufman (1991), can be used in which the outer loop of the cross-validation estimates the performance of the optimized classifiers while the inner layer is used to find the best parameter configuration/variable subset for each classifier. The number of folds can be decided according to the sample, for instance a split ratio of 70-30, 80-20, or another suitable range can be used for each split.

In a greedy backward search, a variable is temporarily removed from MB(T); if the estimated accuracy, that is the classification or regression performance, of the classifier does not drop by this removal, then the variable is permanently removed. After completion of step 245, a minimal subset of variables in MB(T) remains, that still provides the best predictive accuracy for T.

It should be appreciated, however, that different wrappers can be used in the performance of step 245. For example, wrappers including, but not limited to, greedy forward, greedy backward, greedy-forward-backward, wrapping using genetic algorithms, branch-and-bound, and the like can be used. As such, the exemplary wrappers disclosed herein are not intended to be a limitation of the present invention.

Several experiments using different embodiments of the inventive arrangements disclosed herein are discussed below. Regarding variable selection, the HITON embodiment of the present invention illustrated in the Appendix has been applied to the following domains: (1) drug discovery, for instance classification of biomolecules as binding to thrombin, and therefore having potential or not as anti-clotting agents, on the basis of molecular structural properties; (2) clinical diagnosis of arrhythmia into 8 possible categories (7 diseases and normal) on the basis of clinical and EKG data; (3) categorization of text (Medline documents) from the Ohsumed corpus as relevant to neonatal diseases and abnormalities; (4) diagnosis of squamus vs. adenocarcinoma in patients with lung cancer using oligo-nucleotide gene expression array data; and (5) diagnosis of prostate cancer from analysis of mass-spectrometry signal peaks obtained from human sera.

FIG. 3 is a table summarizing characteristics of the data sets used for purposes of experimentation. The data sets used were massive in the number of variables and possessed unfavorable variable-to-sample ratios. In the chosen data sets, the training sample ranged from 160 to 2,541 cases; the number of variables ranged from 279 to 139,351, and the variable-to-sample ratio ranged from 0.67 to 60. Several state-of-the-art classifiers were used. In particular, SVM, KNN, NN's, Decision Trees (DTI), and a text categorization-optimized Naïve Bayes Classifier (SBCtc) as described in Mitchell, T. M., *Machine Learning*.

SVM's, NN's, and KNN were applied to all data sets with the exception of Arrhythmia where DTI was substituted for SVM's as this domain requires a multi-category classification in which SVM's are not yet as well-developed as for binary classification. The text-optimized Bayesian Classifier was used in the text classification task only. Regarding SVM's, the LibSVM implementation was used as described in Chang C. C., Lin, C. J., *LIBSVM: a library for support vector machines* (version 2.3), National Taiwan University, that is based on Platt's SMO technique as described in Platt J., *Sequential Minimal Optimization*, Microsoft Research Technical Report MSR-TR-98-14 (1998), with C chosen from the set: $\{1e-14, 1e-3, 0.1, 1, 10, 100, 1000\}$ and degree from the set: $\{1, 2, 3, 4\}$. Thus, the performance of SVM's as part of the parameterization of polynomial SVM's was effectively examined. For KNN, k was chosen from the range: $[1, \ldots, number\_of\_variables]$. For NN's, the Matlab Neural Network Toolbox was used with 1 hidden layer, number of units chosen (heuristically) from the set $\{2, 3, 5, 8, 10, 30, 50\}$, variable-learning-rate back propagation, performance goal=1e-8 (i.e., an arbitrary value very close to zero), a fixed momentum of 0.001, custom-coded early stopping, and number of epochs chosen from the range $[100, \ldots, 10000]$.

This embodiment of the present invention was compared against several powerful variable selection procedures that have been previously shown to be the best performers in each general type of classification task. These methods included: Univariate Association Filtering (UAF) for all tasks, Recursive Feature Elimination (RFE) for bioinformatics-related tasks, and Forward/Backward Wrapping for clinical diagnosis tasks. The Fisher Scoring Criterion for gene expression data, $Chi^2$ and Information Gain for text categorization, and $G^2$ for the remaining data sets were used.

As shown in FIGS. 4–9, embodiments of the present invention as described with reference to FIG. 2 consistently produced the smallest variable sets in each task/data set; the reduction in variables ranges from 4.4 times (arrhythmia) to 4,315 times (thrombin). With respect to FIGS. 7 and 8, the performance of a technique with an asterisk is not statistically significantly different than the best model according to a Wilcoxon test for comparison of areas under the ROC curve. In 3 out of 5 tasks, the present invention produced a superior classifier or a classifier that was statistically non-significant from other superior classifiers. Averaged over all classifiers in each task/data set, the present invention further produced the models with superior classification performance in 4 out of 5 tasks and exhibited superior classification performance and superior variable reduction.

Another group of experiments compares MMBN with state-of-the-art Bayesian Network techniques, namely PC as disclosed in Spirtes, et al, *Causation, Prediction, and Search*; TPDA as disclosed in Jie, C., R. Greiner, et al., *Learning Bayesian Networks from Data. An Information-Theory Based Approach*, Artificial Intelligence, 137: p. 43–90, (2002); and the Sparse Candidate as disclosed in Friedman, et al., *Learning Bayesian Network Structure from Massive Data sets: The "Sparse Candidate" Algorithm*. The MMBN embodiment was implemented using Matlab 6.5, while the publicly available versions and default values were used for the rest of the techniques. One thousand training instances were generated by randomly sampling from the distribution of ALARM, a Bayesian Network used in a medical diagnosis decision support system described in Beinlich, I. A., H. Suermondt, et al. *The ALARM monitoring system. A case study with two probabilistic inference techniques for belief networks*, Second European Conference in Artificial Intelligence in Medicine, (1989). The data were then processed.

As a measure of comparison, the sensitivity and specificity in edge discovery were used. The sensitivity of a technique is the ratio of correctly identified edges over the total number of edges in the original network. The specificity is the ratio of edges correctly identified as not belonging in the graph over the true number of edges not present in the original network.

A technique can achieve perfect sensitivity or specificity by including or excluding respectively all edges from the output. Thus, a combined measure of these statistics is needed. One such possible measure is the Euclidean distance of the sensitivity and specificity from the perfect score of 1:

$$d=\sqrt{(1-\text{sensitivity})^2+(1-\text{specificity})^2}$$

The area under the ROC curve could not be used because the Sparse Candidate does not have a suitable parameter to vary and create the corresponding curve, while the rest of the techniques provide few points on the curve for a large number of different thresholds. FIG. 10 is a table illustrating comparative results of various processing techniques as applied to the ALARM data set. SC/MI and SC/Sc stand for Sparse Candidate with the Mutual Information and Score heuristic respectively. For Sparse Candidate, k was set equal to 10.

Another experiment demonstrates the scalability of the MMBN embodiment of the present invention. A network with approximately 10,000 variables was created by tiling 270 copies of ALARM. A thousand training instances were randomly generated from the network and the MMBN embodiment was run to identify the edges in the networks. FIG. 11 is a table illustrating results obtained from execution of the MMMB embodiment of the present invention, where the statistics reported are on the task of edge rediscovery.

Notably, the MMBN embodiment scales up very well to a large network with relatively small decrease in quality (keeping constant the size of the training sample). With the MMBN embodiment, ordinary computer hardware is enough for experimentation with networks of the size encountered in a number of challenging biomedical domains. This embodiment is an easily parallelizable technique. Further comparisons regarding the parallelization of the present invention can be found in C. F. Aliferis, I. Tsamardinos, A. Statnikov, *Large-Scale Feature Selection Using Markov Blanket Induction for the Prediction of Protein-Drug Binding*, DSL TR-02-06 (2002).

Another observation is that specificity increases as the number of variables increase. Increasing the number of variables in relatively sparse networks increases the number of true negatives. Thus, the results suggest that the rate of increase in false positives (that reduce specificity) is lower than the rate of increase of true negatives.

The following group of experiments compare the MMMB embodiment of the present invention with various embodiments of the IAMB and IAMBnPC techniques as described in I. Tsamardinos, C. F. Aliferis, and A. Statnikov, *Algorthims for large scale Markov Blanket discovery*, The 16$^{th}$ International FLAIRS Conference (2003), and in I. Tsamardinos, C. F. Aliferis, A. Statnikov, *Time and Sample Efficient Discovery of Markov Blankets and Direct Causal Relations*, presently under review; the Koller-Sahami technique (KS) for all three values of the k parameter, 0, 1, and 2 as described in D. Koller and M. Sahami, *Toward optimal feature selection*, Thirteenth International Conference in Machine Learning (1996); the Grow-Shrink technique (GS); and PC (a total of seven baseline techniques) as referenced in the above manuscripts and references noted therein.

IAMB, IAMBnPC, and Grow-Shrink explicitly try to identify the MB(T) and so their output is directly comparable to the true local structure. KS requires two extra parameters m, and v, with v being the number of variables to retain to approximate the MB(T) and m being a conditioning set size required by the KS method. The value of v was set to the size of the output of the MMMB embodiment so that the two techniques can be more directly compared. The value of m was set to the values used by the inventors of the KS method as referenced in D. Koller and M. Sahami, *Toward optimal feature selection*, Thirteenth International Conference in Machine Learning (1996). As mentioned, PC returns the full network from which the MB(T) can be extracted. PC was not run on any data set larger than 100 nodes and KS was not run on the large Bayesian Networks with 5,000 variables. This is because the average time complexity of KS is $O(|\Phi|^2)$, which is prohibitive for such large networks. Even though all local techniques have a worst-case time complexity of equal or worse order than KS, their average time complexity is much better since it depends on the size of the identified neighborhood which typically is much smaller than the full set $\Phi$ of variables. The quality of the output of KS on small networks was, on the average, much worse than that of the MMPC embodiment, indicating that the results would be the same if it had been possible to run KS on the larger networks.

FIG. 12 is a table illustrating results determined from applying an embodiment of the present invention to data sets of varying sample sizes. More particularly, FIG. 12 illustrates results determined from applying the MMMB embodiment of the present invention to various data sets. In FIG. 12, a cell corresponding to a given data set and sample size with W is labeled, if the average performance (distance) over all targets for the given data set and sample size of the MMMB embodiment was better than all other techniques. Otherwise, the cell is marked with L. The MMMB embodiment performed better than all other techniques in 33 out of 40 cases. Most of the L's were in the Win95PTS network, which was the Bayesian Network that also proved the most difficult for the MMPC embodiment of the present invention.

FIG. 13 is a graph illustrating a comparison of various embodiments of the present invention with conventional methods for determining the Markov Blanket of T on small Bayesian Networks. FIG. 13 depicts the performance of various techniques averaged out over all targets and over all data sets plotted to facilitate a quantitative comparison. As shown, the MMMB embodiment of the present invention exhibited superior performance over all other techniques. Notably, PC, whose performance matched that of the MMPC embodiment on the task of parents and children identification, performed much worse than the MMMB embodiment.

By close examination of the results, it was determined that the performance of PC was significantly reduced for certain data sets. PC assumes dependence unless independence can be proven. If there exists a node for which PC cannot condition on (e.g., due to limited sample or because a node is deterministic), then it will be connected to all other nodes. In addition PC orients everything to point to this node. In the end, everything belongs in any other node's Markov Blanket. Accordingly, such problematic nodes were removed and PC was run again. While the performance increased, PC did not surpass the MMMB embodiment.

FIG. 14 is a graph illustrating a comparison of various embodiments of the present invention with conventional methods for determining the Markov Blanket of T on large Bayesian Networks. FIG. 14 further illustrates that for a sample size of 5,000 instances, the average distance from perfect sensitivity and specificity of the MMMB embodiment is about 0.1. To provide a quantitative sense of performance in practical terms, a typical case of MB(T) identification from the data set from the 5,000 variable ALARM network is shown. In comparison with other local learning techniques, the MMMB embodiment trades off computational effort for reduced required sample. The maximum time observed in the experiments for the MMMB embodiment over all targets and sample size is 21, 392, 49, 341, 43516, 2143, 123701, and 1176 seconds on ALARM, HailFinder, Insurance, Win95PTS, Pigs, ALARM-5K, Hailfinder-5K, and Pigs-5K respectively.

Further experimental comparisons with other techniques using real and simulated data sets for both finding the local causal neighborhood and the Markov Blanket can be found in the following references:

I. Tsamardinos, C. F. Aliferis, A. Statnikov, *Algorithms for Large Scale Markov Blanket Discovery*, Proceedings of the 16th International FLAIRS Conference (2003);

I. Tsamardinos, C. F. Aliferis, A. Statnikov, *Time and Sample Efficient Discovery of Markov Blankets and Direct Causal Relations*, available online;

C. F. Aliferis, I. Tsamardinos, A. Statnikov, *HITON, A Novel Markov Blanket Algorithm for Optimal Variable Selection*, available online.

Additional experiments regarding global causal discovery in relation to learning an undirected Bayesian Network can be found in I. Tsamardinos, C. F. Aliferis, A. Statnikov, L. E. Brown, *Scaling-Up Bayesian Network Learning to Thousands of Variables Using Local Learning Technique*, which is available online. As noted, each of the references disclosed herein is fully incorporated by reference.

The present invention can be realized in hardware, software, or a combination of hardware and software. For example, the present invention can be implemented using Matlab or another data processing tool which can execute on a computer system to process the various data sets disclosed herein. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

APPENDIX

Iterative Associative Markov Blanket (IAMB).

Input: Target T; Data D

Determines the Markov Blanket of T. The current Markov Blanket is denoted as CurrentMB.
   Phase I: Forward
   CurrentMB=Ø
   Repeat
     Find the feature F that maximizes the assoc(F; T|CurrentMB))
     If (assoc(F; T|CurrentMB))≠0 (or lower than a threshold $t_1$)
       Add F to CurrentMB
     End if
   Until CurrentMB has not been modified
   Phase II: Backward
   For each variable X in CurrentMB
     If I(X; T|CurrentMB\{X})
       Remove X from CurrentMB
     End IF
   End For Max Min Bayesian Network (MMBN).

(Target T; Data D) Returns the edges in the Bayesian Network that faithfully capture the joint data distribution.
   For all variables X
     Run MMPC(X, D)
   End For
   Edges={edges (X, Y) such that X∈MMPC(Y, D) or Y∈MMPC(X D)}
   Return Edges Max Min Parents and Children (MMPC).

(Target T; Data D) Returns the parents and children of T. The candidate parents and children are denoted as CPC.
   Phase I: Forward
   CPC=Ø
   Repeat
     For every variable X find
       minassocset(X)=subset s of CPC that minimizes assoc (X;T|s)
     End For
     F=variable of Φ−({T}∪CPC) that maximizes assoc(F; T|minassocset(F))
     If ¬(F;|minassocset(F))
       CPC=CPC∪F/*Add X to CPC*/
     End If
   Until CPC has not changed
   Phase II: Backward
   For all X∈CPC
     If ∃s⊆CPC s.t. I(X;T|s)
       CPC=CPC−X/*Remove X from CP*/
     End If
   End For
   Return CPC Max Min Markov Blanket (MMMB).

(Target T; Data D) Returns the Markov Blanket of T. The parents and children of T are denoted as PCofT, and the current Markov Blanket is denoted as CMB.
   PCofT=MMPC(T, D)
   CMB=∪$_{C∈PCofT}$MMPC(C, D)∪PCofT
   For every potential spouse X∈CMB\PCofT
   Find s such that I(X; T|s)
   For every potential child (direct effect) Y∈PCofT
     If not I(X;T|Y∪s)
       Mark X for inclusion in CMB
     End If
   End For
   Remove X from CMB unless it has been marked
   End For
   Return CMB

HITON.

(Data D; Target T; Classifier A) Returns a minimal set of variables required for optimal classification of T using Algorithm A, where A can be any standard classifier such as Neural Networks, KNN, Decision Trees, Bayesian Classifiers, SVMs, etc.
   MB(T)=HITON-MB(D, T)//Identify Markov Blanket
   Vars=Wrapper(MB(T), T, A)//Use wrapping to remove unnecessary variables Return Vars

HITON-MB.

(Data D, Target T) Returns the Markov Blanket of T.

PC=parents and children of T returned by HITON-PC(D, T)

PCPC=parents and children of the parents and children or T

CurrentMB=PC∪PCPC

//Retain only parents of common children and remove false positives

∀ potential spouse X∈CurrentMB and ∀Y∈PC:
   if ¬∃S⊆{Y}∪V-{T, X} so that I(T; X|S)
   then retain X in CurrentMB
   else remove it Return CurrentMB

HITON-PC.

(Data D, Target T) Returns parents and children of T. The current parents and children are denoted as CurrentPC.

CurrentPC={ }

Repeat
   Find variable $V_i \notin$ CurrentPC that maximizes association(Vi, T) and admit
   $V_i$ into CurrentPC
   If there is a variable X and a subset S of CurrentPC s.t. I(X : T|S))
      remove X from CurrentPC;
      mark X and do not consider it again in for inclusion
Until false Return CurrentPC Wrapper.

(Vars, T, A) Returns a minimal set among variables Vars for predicting T using algorithm A and a wrapping approach.

Select and remove a variable.

If cross-validated performance of A remains the same permanently remove the variable.

Continue until all variables are considered.

What is claimed is:

1. A computerized method of determining a local causal neighborhood of a target variable from a data set, said method comprising:
   (a) adding to a candidate set each variable in the data set having a potential direct causal relationship with the target variable based upon a predefined criteria of association with the target variable, such that no variable of the data set potentially having a direct causal relationship is excluded, the candidate set being defined so as to initially be an empty set prior to the adding step; and
   (b) removing from the candidate set each variable determined to be independent of the target variable after the addition of at least one other variable to the candidate set, wherein the remaining variables of the candidate set define the local causal neighborhood of the target variable, wherein the target variable measures the outcome of a predetermined physical phenomenon, and wherein the variables of the candidate set identify associated phenomena that cause or are caused by the predetermined physical phenomenon.

2. The method of claim 1, wherein the data is represented by a Bayesian Network.

3. The method of claim 1, further comprising:
   prior to said step (a), preprocessing the data set.

4. The method of claim 1, wherein the predefined criteria of association with the target variable is used to determine each variable having a maximum minimum association over all subsets of size up to at least a predetermined value for the candidate set.

5. The method of claim 1, wherein the predefined criteria of association with the target variable is based upon at least one predefined statistical measure that measures the association of a variable with the target variable.

6. The method of claim 1, wherein step (b) is based upon a statistical test of conditional independence.

7. The method of claim 1, wherein said step (a) identifies variables which maximize a univariate association with the target variable.

8. The method of claim 1, wherein step (b) is based upon a $G^2$ statistic that indicates a likelihood that a variable is independent of the target variable.

9. The method of claim 8, wherein step (b) is based upon a Fisher's z-test that indicates a likelihood that a variable is independent of the target variable.

10. The method of claim 1, wherein variables are admitted into the candidate set and false positive variables are removed from the candidate set in an interleaved fashion.

11. The method of claim 1, further comprising:
   distinguishing among the variables of the candidate set to determine direct causes, direct effects, and spouses of the target variable; and
   identifying potential hidden confounders in the candidate set.

12. The method of claim 1, further comprising:
   performing each of said steps for each variable of the data set until all variables contained within the data set have served as the target variable to determine a local causal neighborhood for each variable; and
   combining the local causal neighborhood of each target variable to determine a global causal theory of the data set.

13. The method of claim 1, further comprising:
   adding all variables that are determined to be spouses of the target variable to the local causal neighborhood;
   adding at least one additional variable determined to have a direct causal relationship or be caused by at least one variable identified as having a direct causal relationship or being caused by the target variable; and
   removing each at least one additional variable determined to be conditionally independent of the target variable.

14. The method of claim 13, further comprising:
   removing variables from the candidate set which do not affect the predictive accuracy of the target variable.

15. The method of claim 14, said removing step comprising:
   identifying a subset of all possible subsets of the candidate set with maximum predictive accuracy as determined using cross-validation.

16. The method of claim 1, further comprising iteratively repeating steps (a) and (b) until the candidate set determined at the conclusion of a last iteration is identical to the candidate set determined at the conclusion of the next to last iteration.

17. The method of claim 16, wherein any variable determined to be independent of the target variable is not considered again in any succeeding iteration.

18. The method of claim 1, further comprising ranking each identified variable according to a predefined ranking function.

19. The method of claim 18, wherein steps (a) and (b) are iteratively repeated, and further comprising ranking each identified variable according to a predefined ranking function during one iteration and ranking each identified variable according to a different predefined ranking function during at least one other iteration.

20. The method of claim 1, wherein steps (a) and (b) are preformed sequentially.

21. The method of claim 1, wherein steps (a) and (b) are performed in an interleaved manner such that each removing of a variable is performed after an immediately preceding adding of another variable to the candidate set.

22. A computer system comprising hardware and associated software for determining a local causal neighborhood of a target variable from a data set, said system comprising:
    means for adding to a candidate set each variable in the data set having a potential direct causal relationship with the target variable based upon a predefined criteria of association with the target variable, such that no variable of the data set potentially having a direct causal relationship is excluded, the candidate set being defined so as to initially be an empty set prior to the adding step; and
    means for removing form the candidate set each variable determined to be independent of the target variable after the addition of at least one other variable to the candidate set, wherein the remaining variables of the candidate set define the local causal neighborhood of the target variable, wherein the target variable measures the outcome of a predetermined physical phenomenon, and wherein the variables of the candidate set identify associated phenomena that cause or are caused by the predetermined physical phenomenon.

23. The system of claim 22, wherein the data set is represented by a Bayesian Network.

24. The system of claim 22, further comprising:
    means for preprocessing the data set operative prior to said means for identifying variables of the data set as candidates.

25. The system of claim 22, wherein the predefined criteria of association with the target variable is used to determine each variable having a maximum minimum association over all subsets of size up to at least a predetermined value for the candidate set.

26. The system of claim 22, wherein the predefined criteria of association with the target variable is based upon at least one predefined statistical measure that measures the association of a variable with the target variable.

27. The system of claim 26, wherein said means for removing is configured to apply a statistical test of conditional independence.

28. The system of claim 22, wherein said means for adding to the candidate set each variable in the data set having a potential direct causal relationship with the target variable is configured to identify variables which maximize a univariate association with the target variable.

29. The system of claim 22, wherein said means for removing from the candidate set each variable determined to be independent of the target variable after the addition of at least one other variable to the candidate set is configured to remove at least one variable based upon a $G^2$ statistic that indicates a likelihood that the variable is independent of the target variable.

30. The system of claim 29, wherein said means for removing from the candidate set each variable determined to be independent of the target variable after the addition of at least one other variable to the candidate set is configured to remove at least one variable based upon a Fisher z-test that indicates a likelihood that the variable is independent of the target variable.

31. The system of claim 22, wherein variables are admitted into the candidate set and false positive variables are removed from the candidate set in an interleaved fashion.

32. The system of claim 22, further comprising:
    means for distinguishing among the variables of the candidate set to determine direct causes, direct effects, and spouses of the target variable; and
    means for identifying potential hidden confounders in the candidate set.

33. The system of claim 22, further comprising:
    means for processing each variable of the data set as the target variable to determine a local causal neighborhood for each variable; and
    means for combining the local causal neighborhood of each target variable to determine a global causal theory of the data set.

34. The system of claim 22, further comprising:
    means for adding all variables that are determined to be spouses of the target variable to the local causal neighborhood;
    means for adding at least one additional variable determined to have a direct causal relationship or be caused by at least one variable identified as having a direct causal relationship or being caused by the target variable; and
    means for removing each at least one additional variable determined to be conditionally independent of the target variable.

35. The system of claim 34, further comprising:
    means for removing variables from the candidate set which do not affect the predictive accuracy of the target variable.

36. The system of claim 35, said means for removing variables comprising;
    means for identifying a subset of all possible subsets of the candidate set with maximum predictive accuracy as determined using cross-validation.

37. A machine readable storage, having stored thereon a computer program having a plurality of code sections executable by a machine for causing the machine to perform the steps of:
    (a) adding to a candidate set each variable in the data set having a potential direct causal relationship with the target variable based upon a predefined criteria of association with the target variable, such that no variable of the data set potentially having a direct causal relationship is excluded, the candidate set being defined so as to initially be an empty set prior to the adding step; and
    (b) removing from the candidate set each variable determined to be independent of the target variable after the addition of at least one other variable to the candidate set, wherein the remaining variables of the candidate set define the local causal neighborhood of the target variable, wherein the target variable measures the outcome of a predetermined physical phenomenon, and wherein the variables of the candidate set identify associated phenomena that cause or are caused by the predetermined physical phenomenon.

38. The machine readable storage of claim 37, wherein the data is represented by a Bayesian Network.

39. The machine readable storage of claim 37, further comprising;
    prior to said step (a), preprocessing the data set.

40. The machine readable storage of claim 37, wherein the predefined criteria of association with the target variable is used to determine each variable having a maximum minimum association over all subsets of size up to at least a predetermined value for the candidate set.

41. The machine readable storage of claim 37, wherein the predefined criteria of association with the target variable is based upon at least one predefined statistical measure that measures the association of a variable with the target variable.

42. The machine readable storage of claim 37, wherein step (b) is based upon a statistical test of conditional independence.

43. The machine readable storage of claim 37, wherein said step (a) identifies variables which maximize a univariate association with the target variable.

44. The machine readable storage of claim 37, wherein step (b) is based upon a $G^2$ statistic that indicates a likelihood that a variable is independent of the target variable.

45. The system of claim 37, wherein step (b) is based upon a Fisher's z-test that indicates a likelihood that a variable is independent of the target variable.

46. The machine readable storage of claim 37, wherein variables are admitted into the candidate set and false positive variables are removed from the candidate set in an interleaved fashion.

47. The machine readable storage of claim 37, further comprising:
   distinguishing among the variables of the candidate set to determine direct causes, direct effects, and spouses of the target variable; and
   identifying potential hidden confounders in the candidate set.

48. The machine readable storage of claim 37, further comprising:
   performing each of said steps for each variable of the data set until all variables contained within the data set have served as the target variable to determine a local causal neighborhood for each variable; and
   combining the local causal neighborhood of each target variable to determine a global causal theory of the data set.

49. The machine readable storage of claim 37, further comprising:
   adding all variables that are determined to be spouses of the target variable to the local causal neighborhood;
   adding at least one additional variable determined to have a direct causal relationship or be caused by at least one variable identified as having a direct causal relationship or being caused by the target variable; and
   removing each at least one additional variable determined to be conditionally independent of the target variable.

50. The machine readable storage of claim 49, further comprising:
   removing variables from the candidate set which do not affect the predictive accuracy of the target variable.

51. The machine readable storage of claim 50, said removing step comprising:
   identifying a subset of all possible subsets of the candidate set with maximum predictive accuracy as determined using cross-validation.

52. A computerized method for determining a local causal neighborhood of a target variable from a data set, the method comprising:
   during a first phase, for an initially empty set defining a candidate set and for every variable X contained in the data set,
   (a) finding a minimum associated set of X, s(X), which is subset of the candidate set and that minimizes a predetermined measure of association between X and the target variable T given the minimum associated set s(X);
   (b) determining a variable F, the variable F contained in the data set but not included in the candidate set and not being the target variable T, which maximizes an association between the variable F and the target variable given the minimum associated set s(F), and adding the variable F to the candidate set if and only if F is not statistically independent of the target variable T;
   (c) iteratively repeating steps (a) and (b) until after a last iteration the candidate set is equal to the candidate set after a next-to-last iteration; and
   during a second phase, for every variable Y contained in the candidate set,
   (d) determining whether there exists a subset t of the candidate set such that the variable Y is statistically independent of the target T given the subset t, and if so, then removing Y from the candidate set; and
   (e) identifying the remaining variables of the candidate set as the local causal neighborhood of the target variable T;
   wherein the remaining variables of the candidate set define the local causal neighborhood of the target variable, wherein the target variable measures the outcome of a predetermined physical phenomenon, and wherein the variables of the candidate set identify associated phenomena that cause or are caused by the predetermined physical phenomenon.

53. A computerized method for determining a local causal neighborhood of a target variable from a data set, the method comprising:
   (a) identifying a variable V contained within the data set that maximizes an association with the target variable T based upon a predefined measure of association and adding the identified variable to a candidate set defined to be an initially empty set;
   (b) identifying a variable X within the candidate set for which there exists a subset s of the candidate set such that the variable X is independent of the target set given the subset s, removing the variable X, and marking the variable X; and
   (c) repeating steps (a) and (b) for each unmarked variable until the candidate set contains no variable for which there exists a subset of the candidate set such that the a variable is independent of the target set given any subset of the candidate set;
   wherein the remaining variables of the candidate set define the local causal neighborhood of the target variable, wherein the target variable measures the outcome of a predetermined physical phenomenon, and wherein the variables of the candidate set identify associated phenomena that cause or are caused by the predetermined physical phenomenon.

* * * * *